United States Patent
Liu et al.

(10) Patent No.: US 12,511,045 B2
(45) Date of Patent: Dec. 30, 2025

(54) METHOD, DEVICE, AND COMPUTER PROGRAM PRODUCT FOR DETERMINING SPACE CONSUMPTION

(71) Applicant: Dell Products L.P., Round Rock, TX (US)

(72) Inventors: Wenyang Liu, Beijing (CN); Chen Gong, Beijing (CN); Chunhao Ni, Beijing (CN); Ying Tian, Beijing (CN); Dapeng Chi, Beijing (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/931,273

(22) Filed: Oct. 30, 2024

(65) Prior Publication Data

US 2025/0335091 A1    Oct. 30, 2025

(30) Foreign Application Priority Data

Apr. 26, 2024    (CN) .......................... 202410516252.3

(51) Int. Cl.
*G06F 3/06* (2006.01)

(52) U.S. Cl.
CPC .......... *G06F 3/0608* (2013.01); *G06F 3/0653* (2013.01); *G06F 3/0673* (2013.01)

(58) Field of Classification Search
CPC ..... G96F 3/0608; G96F 3/0653; G96F 3/0673
See application file for complete search history.

(56) References Cited

U.S. PATENT DOCUMENTS

| | | | |
|---|---|---|---|
| 7,631,009 B1 | 12/2009 | Patel et al. | |
| 7,631,155 B1 | 12/2009 | Bono et al. | |
| 7,694,191 B1 | 4/2010 | Bono et al. | |
| 7,818,535 B1 | 10/2010 | Bono et al. | |
| 8,037,345 B1 | 10/2011 | Iyer et al. | |
| 8,285,758 B1 | 10/2012 | Bono et al. | |
| 8,442,952 B1 | 5/2013 | Armangau et al. | |
| 8,903,877 B1 * | 12/2014 | Vempati | G06F 3/0611 707/828 |
| 10,996,869 B1 | 5/2021 | Tamilarasan et al. | |
| 2002/0112008 A1 | 8/2002 | Christenson et al. | |
| 2017/0161294 A1 * | 6/2017 | Ganjihal | G06F 16/1724 |
| 2017/0316027 A1 * | 11/2017 | Mondal | G06F 16/182 |
| 2020/0042399 A1 | 2/2020 | Kuang et al. | |
| 2020/0042616 A1 | 2/2020 | Kuang et al. | |

(Continued)

*Primary Examiner* — Hiep T Nguyen
(74) *Attorney, Agent, or Firm* — BainwoodHuang

(57) ABSTRACT

Techniques for determining space consumption involve acquiring a first feature set of a storage system, wherein the first feature set comprises at least a size of logical space of the storage system. Such techniques further involve determining space consumption for file system checks of the storage system by a machine learning model based on the first feature set. Such techniques further involve adjusting a reserved value of physical storage space of the storage system in response to the determined space consumption meeting a predetermined condition. In this way, it is possible to predict a total amount of space to be consumed by a file system checking tool based on collection of data of the storage system, and to adjust a reserved value of physical storage space of the storage system based on the predicted value, so as to ensure metadata repair of the storage system.

20 Claims, 11 Drawing Sheets

(56) References Cited

U.S. PATENT DOCUMENTS

| | | |
|---|---|---|
| 2020/0042617 A1 | 2/2020 | Kuang et al. |
| 2020/0250040 A1 | 8/2020 | Vankamamidi et al. |
| 2021/0334042 A1* | 10/2021 | Gao .................. G06F 3/0653 |
| 2021/0342215 A1 | 11/2021 | Chawla et al. |
| 2021/0342273 A1 | 11/2021 | Patel et al. |
| 2021/0406241 A1 | 12/2021 | Patel et al. |
| 2022/0027059 A1 | 1/2022 | Chen et al. |
| 2023/0118349 A1 | 4/2023 | Mathews et al. |

\* cited by examiner

| | FSCK Tier | Logical Space | Physical Space | Data Compression Ratio | Namespace Objects | Metadata Tier | VLB Tier | User Tier | Metadata Occupation | VLB Occupation | User Logical Space | User Physical Space |
|---|---|---|---|---|---|---|---|---|---|---|---|---|
| FSCK Tier | 1.000000 | 0.999799 | 0.656543 | -0.147363 | 0.720125 | 0.628759 | 0.774549 | 0.878489 | 0.385634 | 0.622705 | 0.583138 | 0.692443 |
| Logical Space | 0.999799 | 1.000000 | 0.648923 | -0.144955 | 0.722501 | 0.630926 | 0.774223 | 0.875597 | 0.388698 | 0.623376 | 0.577498 | 0.692150 |
| Physical Space | 0.656543 | 0.648923 | 1.000000 | -0.183454 | 0.327899 | 0.160884 | 0.378859 | 0.729684 | 0.040967 | 0.238515 | 0.839716 | 0.542086 |
| Data Compression Ratio | -0.147363 | -0.144955 | -0.183454 | 1.000000 | -0.125330 | -0.226692 | -0.155133 | -0.194718 | -0.124699 | -0.122269 | -0.148375 | -0.139565 |
| Namespace Objects | 0.720126 | 0.722501 | 0.327899 | -0.125330 | 1.000000 | 0.429722 | 0.532983 | 0.575450 | 0.375418 | 0.506131 | 0.386765 | 0.572075 |
| Metadata Tier | 0.638759 | 0.630926 | 0.160884 | -0.226692 | 0.429722 | 1.000000 | 0.809571 | 0.662723 | 0.593854 | 0.580961 | 0.100913 | 0.460958 |
| VLB Tier | 0.774549 | 0.774223 | 0.378859 | -0.155133 | 0.532983 | 0.809571 | 1.000000 | 0.816091 | 0.401471 | 0.714983 | 0.308376 | 0.580478 |
| User Tier | 0.878489 | 0.875597 | 0.729884 | -0.194718 | 0.575450 | 0.662733 | 0.816091 | 1.000000 | 0.311014 | 0.574937 | 0.587445 | 0.713759 |
| Metadata Occupation | 0.385634 | 0.388698 | 0.040967 | -0.124699 | 0.375418 | 0.592854 | 0.401471 | 0.311014 | 1.000000 | 0.831591 | 0.372217 | 0.756040 |
| VLB Occupation | 0.622705 | 0.623376 | 0.368515 | -0.122269 | 0.506131 | 0.580981 | 0.749833 | 0.574937 | 0.831591 | 1.000000 | 0.531821 | 0.875914 |
| User Logical Space | 0.583138 | 0.577498 | 0.839716 | -0.148375 | 0.386765 | 0.100913 | 0.308376 | 0.587445 | 0.372217 | 0.551821 | 1.000000 | 0.778761 |
| User Physical Space | 0.692443 | 0.692150 | 0.542086 | -0.139565 | 0.572075 | 0.460958 | 0.580478 | 0.713759 | 0.756040 | 0.875914 | 0.778761 | 1.000000 |

METHOD, DEVICE, AND COMPUTER PROGRAM PRODUCT FOR DETERMINING SPACE CONSUMPTION

CROSS-REFERENCE TO RELATED APPLICATION

This application claims priority to Chinese Patent Application No. CN202410516252.3, on file at the China National Intellectual Property Administration (CNIPA), having a filing date of Apr. 26, 2024, and having "METHOD, DEVICE, AND PRODUCT FOR DETERMINING SPACE CONSUMPTION" as a title, the contents and teachings of which are herein incorporated by reference in their entirety.

TECHNICAL FIELD

The present disclosure relates to the field of data storage and, more particularly, to a method, a device, and a computer program product for determining space consumption.

BACKGROUND

Metadata plays a vital role in storage systems, and it describes information such as attributes, organization, and relationships of data, and is the basis for data understanding and access. First, metadata can record key information such as the storage position and the access situation of data. This enables administrators to accurately grasp the flow and usage of data and thus implement targeted security policies. Second, metadata can also be used for rights management. In a storage system, metadata can record the access right and the role of each user, thus ensuring that only authorized users can access specific data. In addition, metadata can further help enable encryption and desensitization of data. By tagging the metadata of sensitive data, a storage system can encrypt the data during storage and transmission, thus ensuring that even if the data is stolen, it cannot be easily decrypted.

When metadata of a storage system is damaged, it is often repaired by a file system check (FSCK) tool. In some scenarios, the repair process of metadata by the FSCK tool includes three phases: redundant array of independent disks (RAID) repair, mapper repair, and namespace repair. Among them, in the mapper repair phase, the repair tool consumes some physical storage space since it browses and recovers information such as pipeline burst cache (PLB) and integrated data protection (IDP), thereby generates incremental log records, and stores them to a disk. Three typical types of incremental log records include leaf node incremental log records, virtual incremental log records, and defragmentation incremental log records. In a storage system, a certain amount of physical storage space is usually reserved for the repair tool.

SUMMARY OF THE INVENTION

Embodiments of the present disclosure provide a method, a device, and a computer program product for determining space consumption.

In a first aspect of embodiments of the present disclosure, a method for determining space consumption is provided. The method includes acquiring a first feature set of a storage system, wherein the first feature set includes at least a size of logical space of the storage system. The method further includes determining space consumption for file system checks of the storage system by a machine learning model based on the first feature set. The method further includes adjusting a reserved value of physical storage space of the storage system in response to the determined space consumption meeting a predetermined condition.

In a second aspect of the embodiments of the present disclosure, an electronic device is provided. The electronic device includes one or more processors; and a storage apparatus for storing one or more programs, wherein the one or more programs, when executed by the one or more processors, cause the one or more processors to implement a method for determining space consumption, the method including acquiring a first feature set of a storage system, wherein the first feature set includes at least a size of logical space of the storage system. The method further includes determining space consumption for file system checks of the storage system by a machine learning model based on the first feature set. The method further includes adjusting a reserved value of physical storage space of the storage system in response to the determined space consumption meeting a predetermined condition.

In a third aspect of embodiments of the present disclosure, a computer-readable storage medium is provided, which has a computer program stored thereon, wherein the computer program, when executed by a processor, implements a method for determining space consumption, the method including acquiring a first feature set of a storage system, wherein the first feature set includes at least a size of logical space of the storage system. The method further includes determining space consumption for file system checks of the storage system by a machine learning model based on the first feature set. The method further includes adjusting a reserved value of physical storage space of the storage system in response to the determined space consumption meeting a predetermined condition.

It should be understood that the content described in the Summary of the Invention part is neither intended to limit key or essential features of the embodiments of the present disclosure, nor intended to limit the scope of the present disclosure. Other features of the present disclosure will become readily understood from the following descriptions.

BRIEF DESCRIPTION OF THE DRAWINGS

The above and other features, advantages, and aspects of the embodiments of the present disclosure will become more apparent with reference to the accompanying drawings and the following detailed description. In the accompanying drawings, identical or similar reference numerals represent identical or similar elements, in which:

FIGS. 5A and 5B illustrate a schematic diagram of the degree of correlation of features in a first training set according to some embodiments of the present disclosure, and a heat map of the degree of correlation of features in the first training set according to some embodiments of the present disclosure;

DETAILED DESCRIPTION

Figure 1:
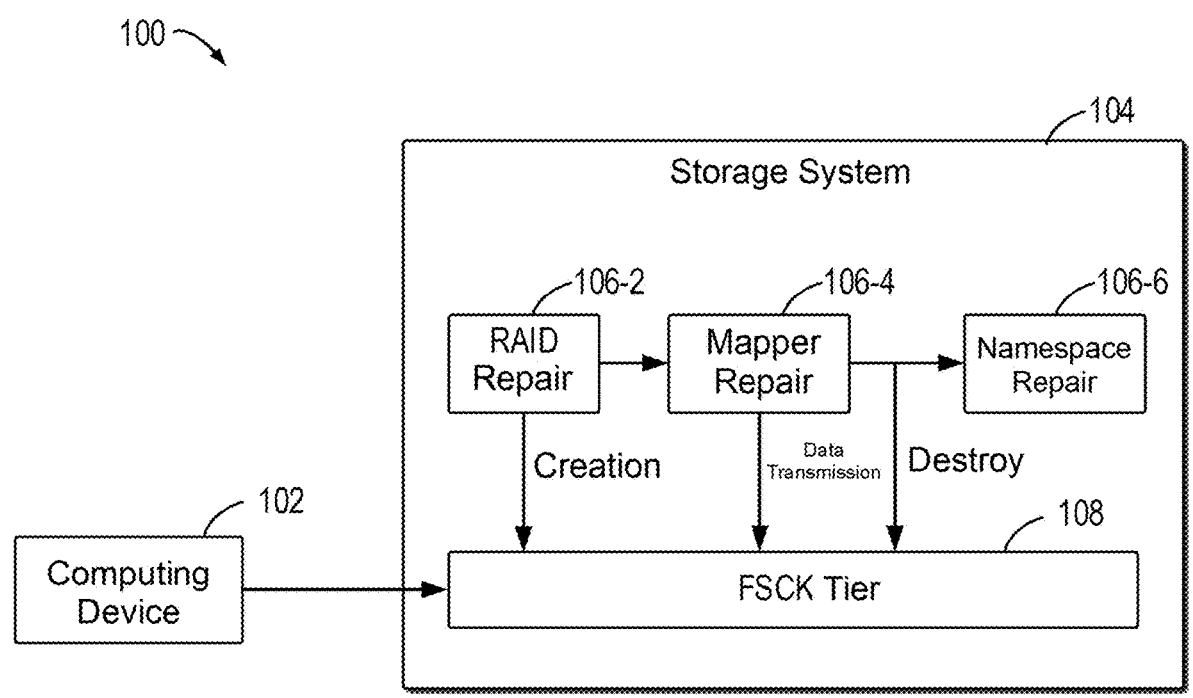
FIG. 1 illustrates a schematic diagram of an example environment in which a plurality of embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The embodiments of the present disclosure will be described below in further detail with reference to the accompanying drawings. Although the accompanying drawings show some embodiments of the present disclosure, it should be understood that the present disclosure may be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the scope of protection of the present disclosure.

In the description of the embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or the same objects. Other explicit and implicit definitions may also be included below.

Metadata plays a vital role in storage systems, and it describes information such as attributes, organization, and relationships of data, and is the basis for data understanding and access. Metadata damage in storage systems is a serious issue that can lead to a series of problems with data access, management, and security. When metadata is damaged, users may not be able to accurately understand the meaning, the origin, and the structure of the data, which can affect how the data is used and analyzed. When the metadata of a storage system is damaged, it is often repaired by an FSCK tool.

During the repair process for the metadata of the storage system by the FSCK tool, a certain amount of physical storage space is consumed as it involves the generation of incremental log records. In order to ensure successful metadata repair for the storage system, the storage system often reserves a certain amount of physical storage space for the FSCK tool. However, there is currently no available method to know exactly how much physical storage space is consumed when the FSCK tool is running. Therefore, there is a need for a method to determine the space consumption of the FSCK tool so that sufficient physical storage space can be reserved for the FSCK tool to ensure successful metadata repair for the storage system.

To this end, embodiments of the present disclosure propose a scheme for determining space consumption. In embodiments of the present disclosure, a first feature set of a storage system may be acquired, wherein the first feature set includes at least a size of logical space of the storage system. The space consumption during the process of running an FSCK tool to repair the metadata of the storage system may also be determined by a machine learning model based on the first feature set. Then, a reserved value of the physical storage space of the storage system for the FSCK tool may be adjusted in response to the determined space consumption meeting a predetermined condition.

In this way, it is possible to predict a total amount of space to be consumed by an FSCK tool based on collection of data of the storage system, and to adjust a reserved value of physical storage space of the storage system based on the predicted value, so as to ensure successful metadata repair of the storage system.

FIG. 1 illustrates a schematic diagram of an example environment 100 in which a plurality of embodiments of the present disclosure can be implemented. As shown in FIG. 1, the environment 100 includes a computing device 102 and a storage system 104. The storage system 104 includes an FSCK tier 108 that occupies a certain amount of physical storage space. The process of repairing metadata of the storage system 108 by an FSCK tool includes three phases: RAID repair 106-2, mapper repair 106-4, and namespace repair 106-6 (collectively referred to as FSCK repair 106). Upon completion of the RAID repair 106-2 phase, the FSCK tool allocates the FSCK tier 108 using the available disk slices in the storage system 104. After that, during the mapper repair 106-4 phase, the FSCK tool stores incremental log records into the FSCK tier 108. Incremental log record is primarily used to record all changes made to the storage system since the last full log record or incremental log record, so as to reduce the time and resources required during the recovery of the storage system. When the FSCK tool completes the mapper repair 106-4 phase, the FSCK tier 108 will be destroyed, and the FSCK tool proceeds to the namespace repair 106-6 phase.

As shown in FIG. 1, in the environment 100, the computing device 102 may calculate the size of space actually occupied by the FSCK tier 108 by collecting data of the storage system 104. For example, the computing device 102 may collect the size of logical space occupied, the size of physical space occupied, and namespace object features of the storage system 104 and calculate the size of space actually occupied by the FSCK tier 108 in accordance with various implementations of the present disclosure.

Figure 2:
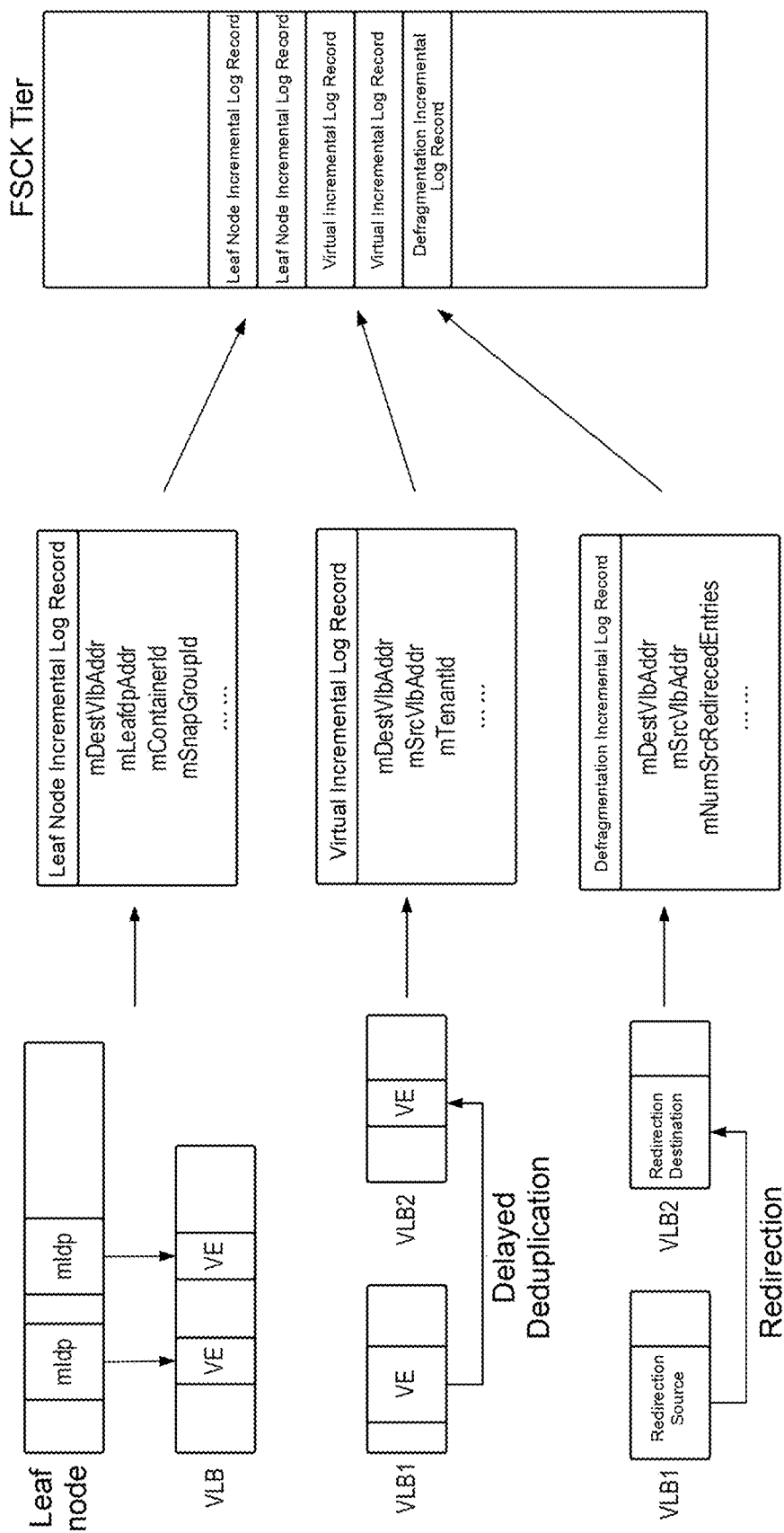
FIG. 2 illustrates a schematic diagram of a process for storing incremental log records at an FSCK tier according to some embodiments of the present disclosure.

FIG. 2 illustrates a schematic diagram of a process for storing incremental log records at an FSCK tier according to some embodiments of the present disclosure. As shown in FIG. 2, the FSCK tool may write three types of incremental log records to the FSCK tier 108 during the mapper repair 106-4 phase to represent the relationships between leaf nodes and virtual environments (VEs), between virtual load balancing (VLB) and VLB, and between VEs and VEs. Leaf node incremental log records save the relationship between leaf nodes and VEs by storing leaf node IDP pointers and the VE addresses they point to, virtual incremental log records save the relationship between VEs by storing the source VE addresses and the target VE addresses for delayed deduplication, and defragmentation incremental log records save the VLB redirection relationship by storing the source VLB addresses and target VLB addresses for redirection. Finally, the FSCK tool will read and use these incremental logs during the merge phase of the mapper repair to perform the merge work (verifying VE reference counts)

Figure 3:
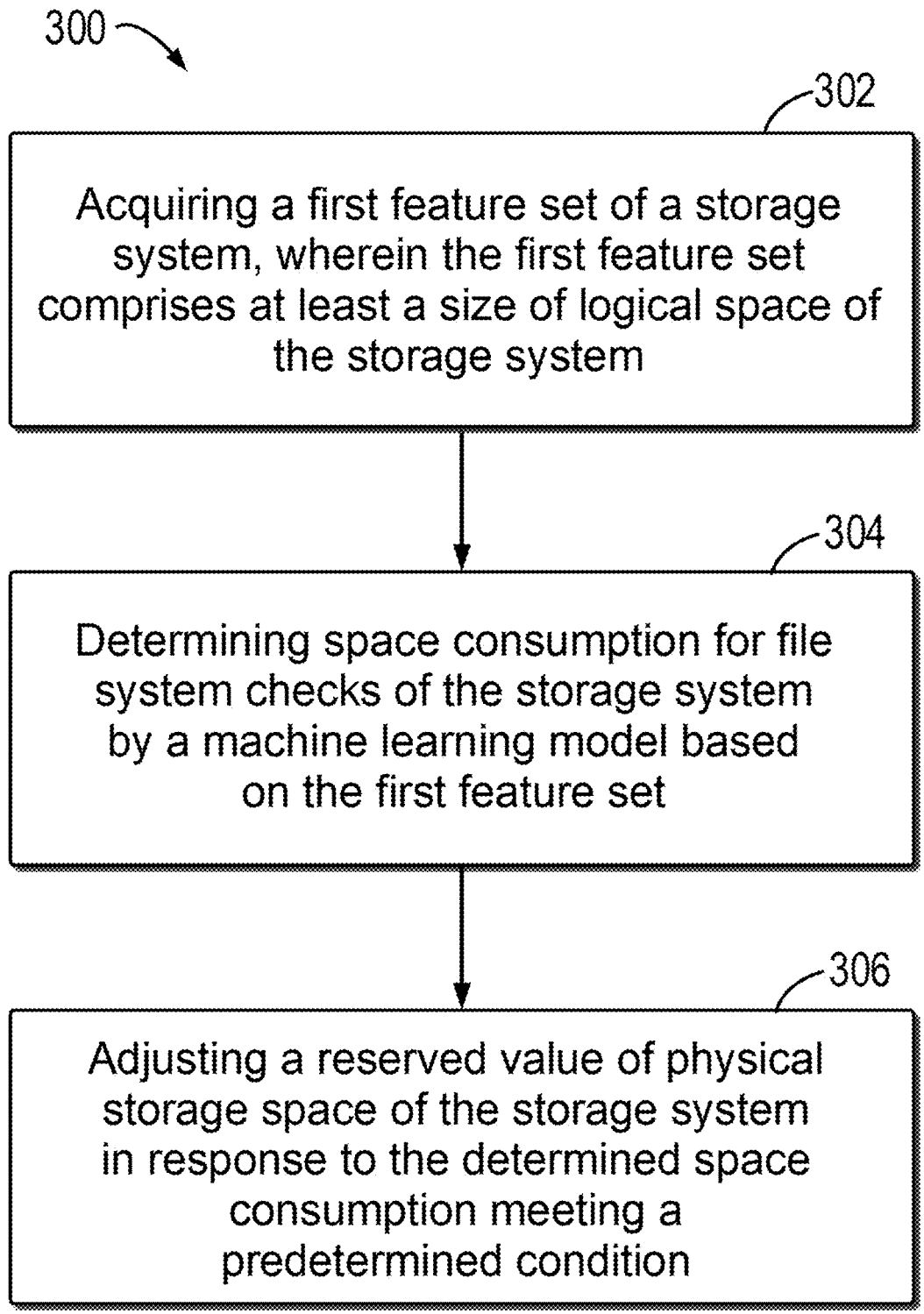
FIG. 3 illustrates a flow chart of a method for determining space consumption according to some embodiments of the present disclosure.

FIG. 3 illustrates a flow chart of a method 300 for determining space consumption according to some embodiments of the present disclosure. As shown in FIG. 3, at block 302, the method 300 acquires a first feature set of a storage system, wherein the first feature set includes at least a size of logical space of the storage system. For example, the first feature set may include sizes of logical space and sizes of physical space occupied by different users in the storage system, and may also include the magnitudes of the numbers of volume, snapshot, and clone counts, as well as data information corresponding to metadata and user data.

At block 304, the method 300 determines space consumption for file system checks of the storage system based on the first feature set by a machine learning model. In some embodiments, in order to reduce the complexity of the first feature set, a second feature set may also be acquired by performing feature extraction on the first feature set based on a feature extraction strategy, wherein the number of features of the second feature set is smaller than that of the first feature set. In some embodiments, the feature extraction of the first feature set may be performed by merging sizes of logical space and sizes of physical space occupied by different users in the storage system. For example, there are users with a user number of 1 and a user number of 5 in the storage system, and the first feature set contains the size of logical space and the size of physical space occupied by each of user 1 and user 5. The combined size of logical space and combined size of physical space can then be obtained by adding the size of logical space and the size of physical space occupied by each of user 1 and user 5, and written into the second feature set, thereby reducing the complexity of data.

In some embodiments, feature extraction of the first feature set may also be performed by merging namespace object features in the storage system. For example, if the first feature set counts volume, snapshot, and clone count information of the storage system, the volume, snapshot, and clone counts can be added together to obtain the namespace object features and written to the second feature set, thereby reducing the complexity of data.

At block 306, the method 300 adjusts a reserved value of physical storage space of the storage system in response to the determined space consumption meeting a predetermined condition. For example, the storage system pre-reserves 2.5% of the space of total physical storage for the FSCK tool, and when the determined space consumption of the FSCK tool exceeds 2.5% of the total physical storage, the reserved value of 2.5% may be adjusted upward based on the amount of space actually occupied by the FSCK tool to ensure that the FSCK tool can successfully perform a full recovery of the metadata of the storage system.

In this way, the method 300 can predict a total amount of space to be consumed by an FSCK tool based on collection of data of the storage system 104, and to adjust a reserved value of the physical storage space of the storage system 104 based on the predicted value, so as to ensure that metadata repair for the storage system 104 is performed successfully.

Figure 4:
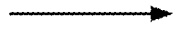
FIG. 4 illustrates a schematic diagram of a process for performing feature extraction on a first feature set to obtain a second feature set according to some embodiments of the present disclosure.

FIG. 4 illustrates a schematic diagram of a process for performing feature extraction on a first feature set to obtain a second feature set according to some embodiments of the present disclosure. As shown in FIG. 4, the first feature set includes the sizes of logical space and the sizes of physical space occupied by different users, as well as the magnitudes of the numbers of volume, snapshot, and clone counts of the storage system and data information corresponding to metadata and user data. In the second feature set, the sizes of logical space and physical space occupied by different users are merged, and also the information on the magnitudes of the numbers of volume, snapshot, and clone counts is merged into namespace object features, which greatly reduces the complexity of the data.

In some embodiments, the machine learning model may be a pre-trained linear regression model. When determining the space consumption of the FSCK tool using the linear regression model, a target feature associated with the space consumption for file system checks of the storage system may first be acquired from the second feature set, and then the target feature may be input into the linear regression model to determine the space consumption for file system checks of the storage system.

In some embodiments, the target feature may be determined by the following method: a first training set for determining the target feature is first acquired, wherein the first training set includes at least a size of logical space in the storage system and the space consumption for file system checks of the storage system; a degree of correlation between the space consumption for file system checks of the storage system and the remaining features in the first training set may then be determined by a data analysis method; and finally, the target feature is determined based on the degree of correlation.

Figure 5B:
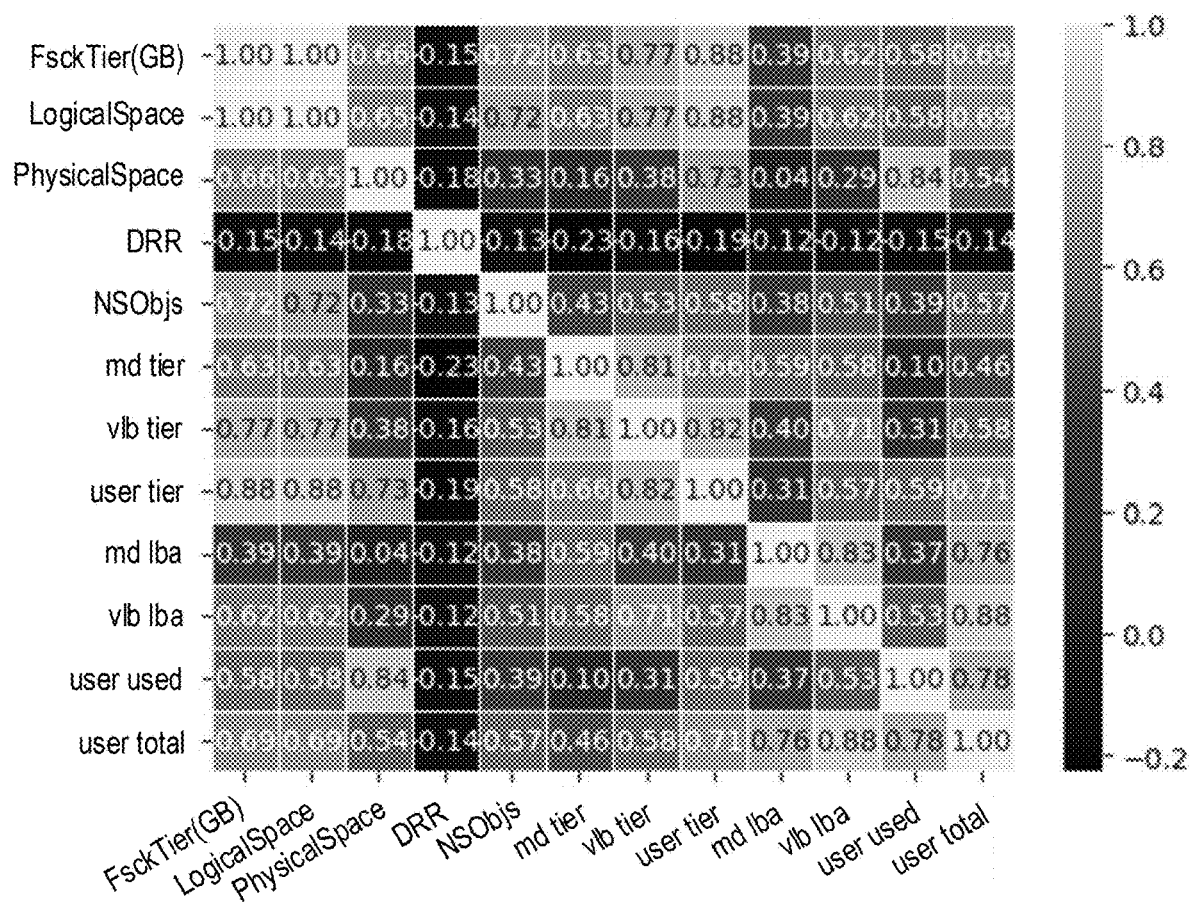

FIGS. 5A and 5B illustrate a schematic diagram of the degree of correlation of features in a first training set according to some embodiments of the present disclosure, and a heat map of the degree of correlation of features in the first training set according to some embodiments of the present disclosure. As shown in FIGS. 5A and 5B, the size of logical space has a higher degree of correlation with the space consumption of the FSCK tier compared with other features. Thus, the size of logical space may be determined as the target feature.

In some embodiments, after the target feature is determined, the linear regression model may be trained based on a second training set that includes the target feature and the actual space consumption of the corresponding FSCK tool. In some embodiments, training data in the second training set may be pre-processed. The pre-processing may include data cleaning and data transformation, wherein the data cleaning can improve the quality of the data, thereby improving the training effect of the model; and the data transformation can facilitate subsequent calculations and improve the training efficiency of the model.

In some embodiments, the pre-training process of the linear regression model may be implemented using a number of equations described below. Herein, for computational convenience, x is used to denote the size of logical space/64 GB of the storage system (e.g., storage system 104 in FIG. 1), and the parameters $\theta_0$ and $\theta_1$ are introduced, then the predicted value $H_\theta(x)$ of the space consumption of the FSCK tier can be calculated by the following Equation (1):

$$H_\theta(x) = \theta_0 + \theta_1 * x \quad (1)$$

Herein, y is used to denote the actual space consumption of the FSCK tier, then the cost function $J_\theta(\theta_0, \theta_1)$ can be calculated by the following Equation (2) to measure the closeness between the predicted values and true values of the space consumption of the FSCK tier:

$$J_\theta(\theta_0, \theta_1) = \frac{1}{2n}\sum_{i=0}^{n}(H_\theta(x)^{(i)} - y^{(i)})^2 \quad (2)$$

In order to obtain the closest hypothetical value to the target output y, it is necessary to find the parameter pair ($\theta_0$, $\theta_1$) to minimize the value of the cost function $J_\theta(\theta_0, \theta_1)$. Given a random initial parameter pair ($\theta_0$, $\theta_1$), the partial derivatives $$\frac{\partial J_\theta(\theta_0, \theta_1)}{\partial \theta_0} \text{ and } \frac{\partial J_\theta(\theta_0, \theta_1)}{\partial \theta_1}$$

of the cost function $J_\theta(\theta_0, \theta_1)$ based on these two variables can be calculated by the following Equations (3) and (4) to update the variables $\theta_0$ and $\theta_1$ so as to obtain a relatively small loss in the next training iteration:

$$\frac{\partial J_\theta(\theta_0, \theta_1)}{\partial \theta_0} = \frac{1}{n}\sum_{i=0}^{n}(H_\theta(x)^{(i)} - y^{(i)}) \quad (3)$$

$$\frac{\partial J_\theta(\theta_0, \theta_1)}{\partial \theta_1} = \frac{1}{n}\sum_{i=0}^{n}(H_\theta(x)^{(i)} - y^{(i)}) * x^{(i)} \quad (4)$$

Herein, $\alpha$ is used to denote the learning rate of the linear regression model, then the parameter pair ($\theta_0$, $\theta_1$) can be updated simultaneously by the following Equations (5) and (6) after each round of training iterations:

$$\theta_0 = \theta_0 - \alpha * \frac{\partial J_\theta(\theta_0, \theta_1)}{\partial \theta_0} \quad (5)$$

$$\theta_1 = \theta_1 - \alpha * \frac{\partial J_\theta(\theta_0, \theta_1)}{\partial \theta_1} \quad (6)$$

Figure 6A:
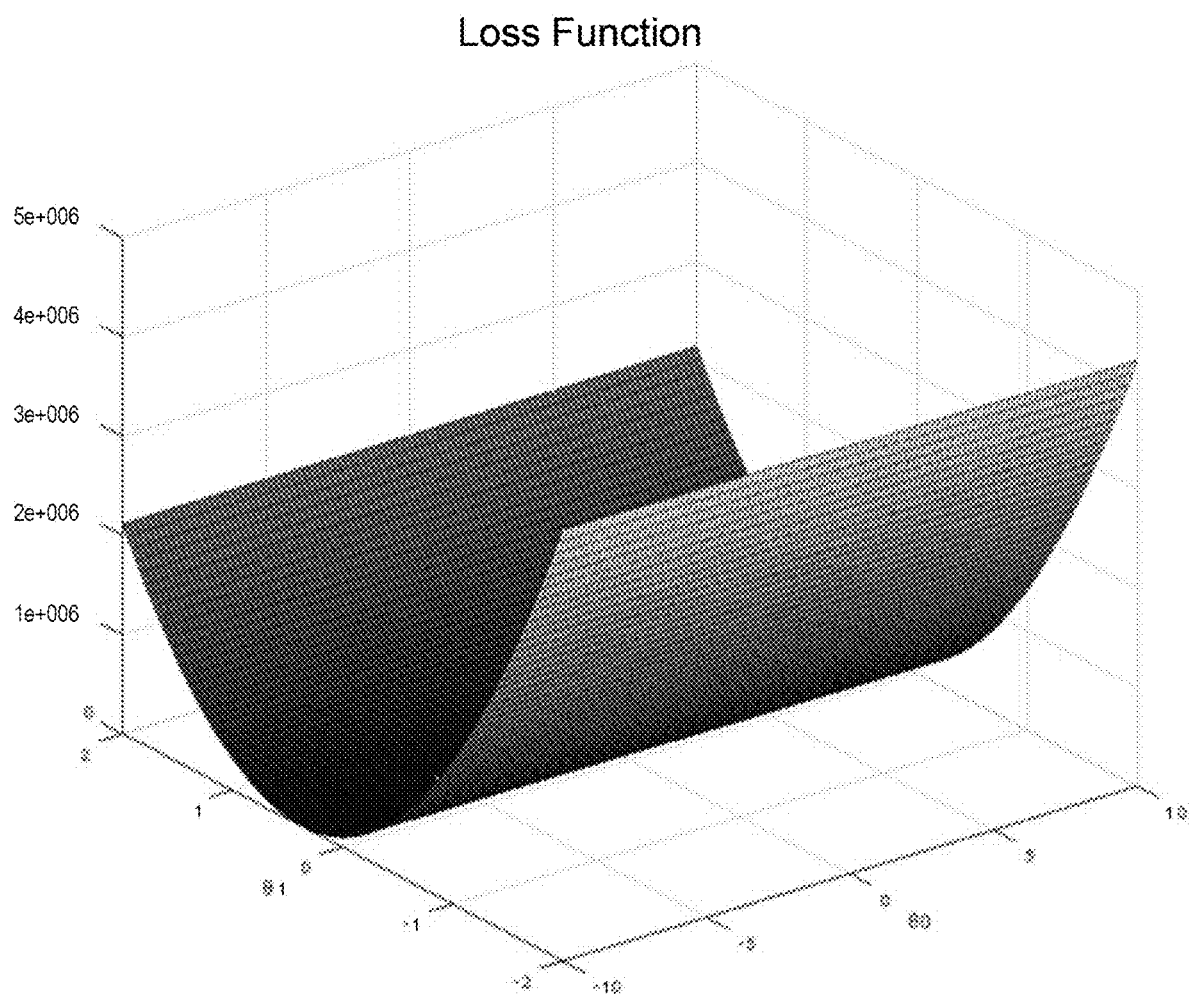
FIG. 6A illustrates a schematic diagram of a loss function for a training phase of a linear regression model according to some embodiments of the present disclosure.

FIG. 6A illustrates a schematic diagram of a loss function for a training phase of a linear regression model according to some embodiments of the present disclosure. As shown in FIG. 6A, having suitable values for the parameter pair ($\theta_0$, $\theta_1$) can minimize the loss function. In some embodiments, the learning rate a can be set to 0.0000001, and the values (0.856512, 0.348667) of the parameter pair ($\theta_0$, $\theta_1$) can be obtained by the training process described above. Thus, the predicted value $H_\theta(x)$ of the space consumption of the FSCK tier can be calculated by the following Equation (7):

$$H_\theta(x) = 0.856512 + 0.348667 * x \quad (7)$$

Figure 6B:
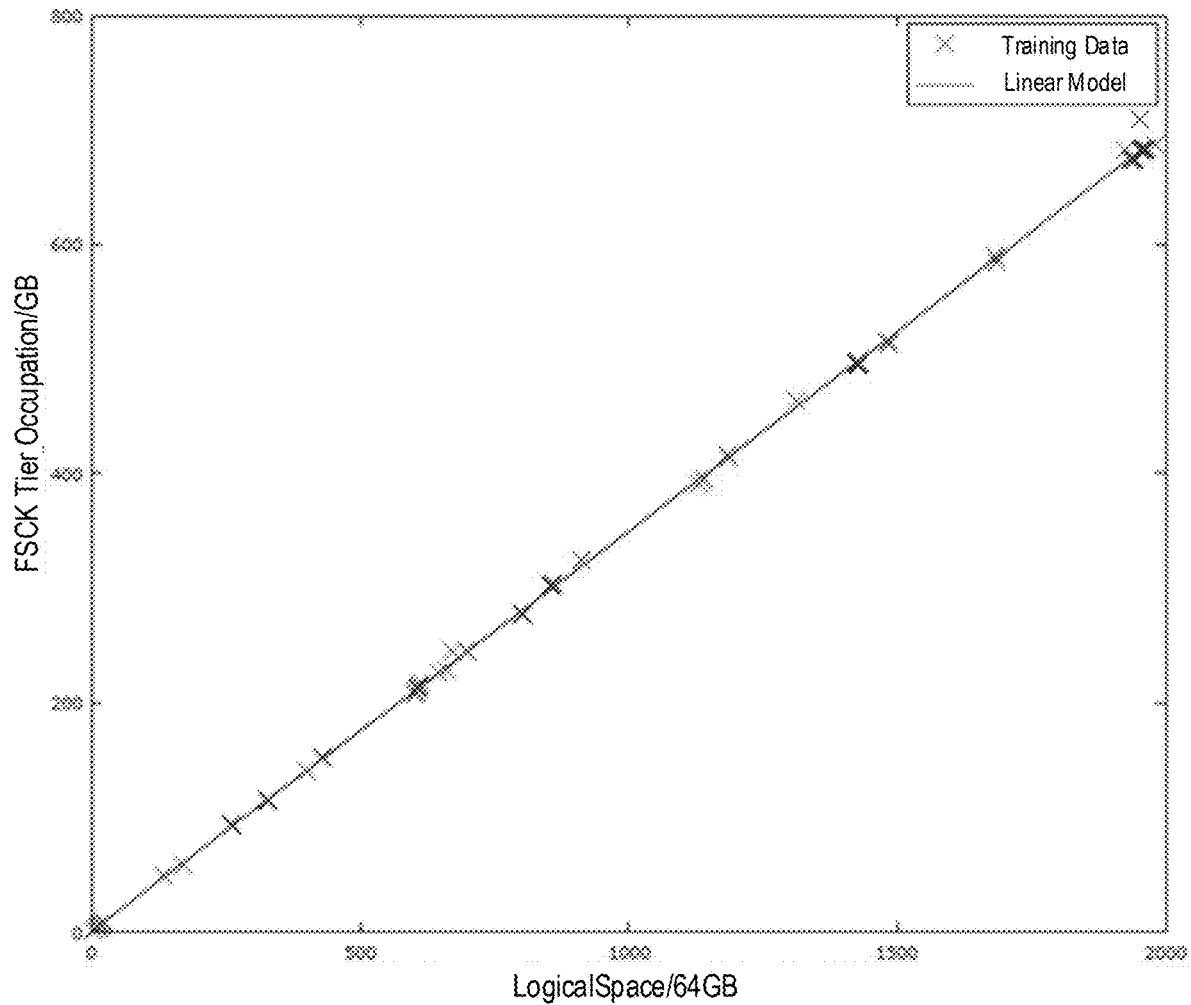
FIG. 6B illustrates a schematic diagram of a comparison of predicted values and true values for the training phase of a linear regression model according to some embodiments of the present disclosure.

FIG. 6B illustrates a schematic diagram of a comparison of predicted values and true values for the training phase of a linear regression model according to some embodiments of the present disclosure. As shown in FIG. 6B, a straight line is used to represent the physical storage space occupation of the FSCK tier predicted based on the size of logical space, and x is used to denote the true value of the space consumption of the FSCK tier in the training data. From FIG. 6B, it can be seen that the prediction of the space consumption of the FSCK tier using the linear regression model has good accuracy.

By using the linear regression model to predict the space consumption of the FSCK tier, although certain data analysis is required in the training phase to determine the target features, the parameters of the linear regression model are transparent, and thus further analysis can be performed based on the above prediction function to determine whether the space reserved value given to the FSCK tool by the storage system is sufficient.

Herein, p is used to denote the total physical space of the storage system, and l is used to denote the actual size of logical space of the storage system. In some embodiments, the storage system may reserve 2.5% of the total physical space to the FSCK tool, then the following Inequality (8) should be met:

$$0.025 * p \geq H_\theta(x) = 0.856512 + 0.348667 * x \approx 0.35 * (l/64) \quad (8)$$

Herein, the variable p' is used to denote the actually used physical space of the storage system, and DRR is used to denote the overall data compression rate of the storage system, then the following Inequality (9) should be met:

$$0.025 * p \geq (0.35/64) * p' * DDR \quad (9)$$

Thus, when the actually used physical space p' reaches the total physical capacity p, the DRR is the factor that determines whether the space reserved value given by the storage system to the FSCK tool is sufficient. From Equation (9) above, it can be seen that when the reserved value is 2.5%, the DDR should not exceed 4.57.

In some embodiments, the machine learning model may also be a pre-trained neural network model. When using the neural network model to determine the space consumption of the FSCK tool, the first feature set or the second feature set may be used directly as an input to the model without prior data analysis of the features in the feature set.

In some embodiments, before inputting the first feature set or the second feature set into the neural network model, pre-processing such as data cleaning and normalization processing may be performed on the first feature set or the second feature set. The data cleaning can improve the quality of the data, thereby improving the training effect of the model; and the normalization processing can improve the comparability of the data, thereby improving the training efficiency of the model.

In some embodiments, a third training set including various collected data of the storage system and the actual space occupation of the FSCK tool may be acquired, and the features about the storage system in the third training set may be used as an input tensor, and the actual space occupation of the FSCK tool may be used as an output tensor, so as to train the neural network model. Optionally, the neural network model may use an architecture of input layer-fully connected layer-ReLU-fully connected layer-ReLU-fully connected layer-output layer.

In some embodiments, the learning rate of the neural network model may be set to 0.001, the training period may be set to 10,000, and the total loss may be output after every 1,000 training cycles, so as to update the weights and the bias values in the neural network model.

Figure 7A:
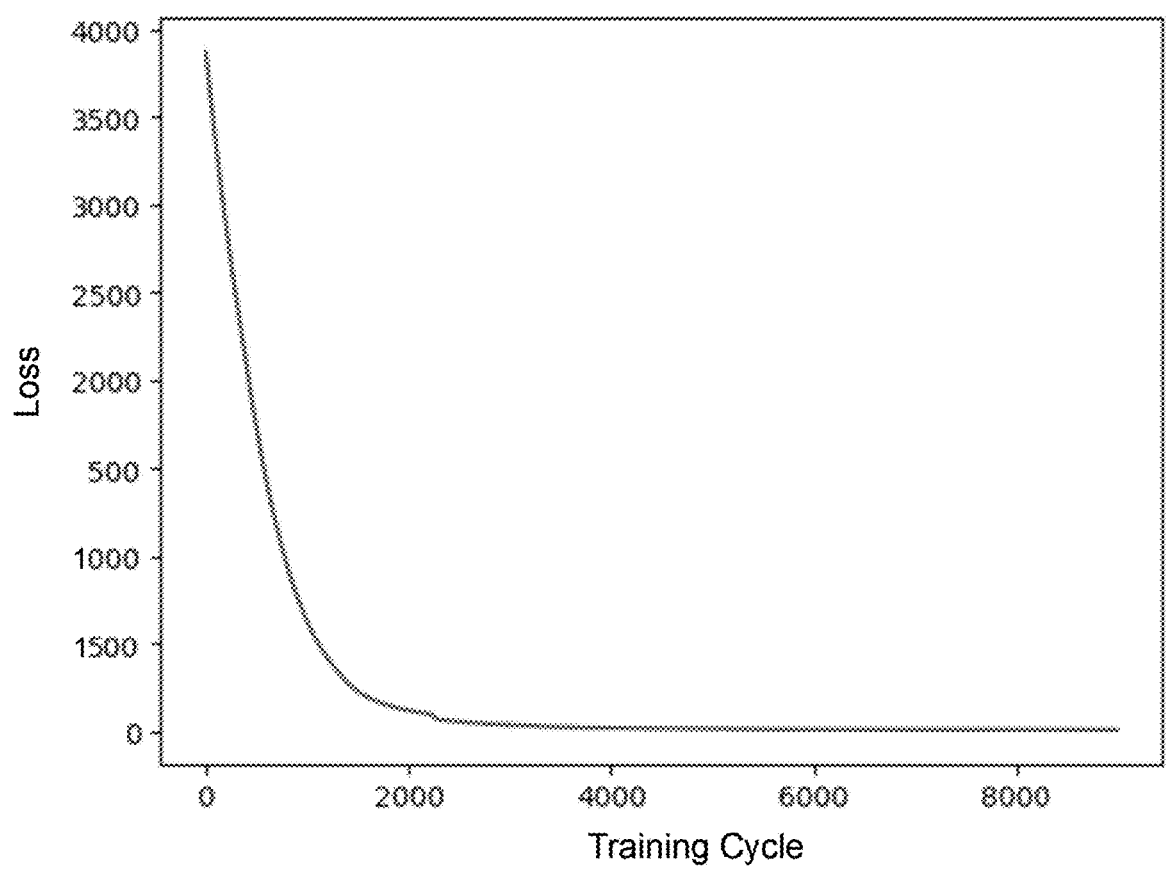
FIG. 7A illustrates a schematic diagram of a loss function for a training phase of a neural network model according to some embodiments of the present disclosure.

FIG. 7A illustrates a schematic diagram of a loss function for a training phase of a neural network model according to some embodiments of the present disclosure. As shown in FIG. 7A, the loss of the neural network model decreases substantially from the initial phase of training to about the 2000th cycle, while after about 2000 training cycles, the model gradually becomes more stable.

Figure 7B:
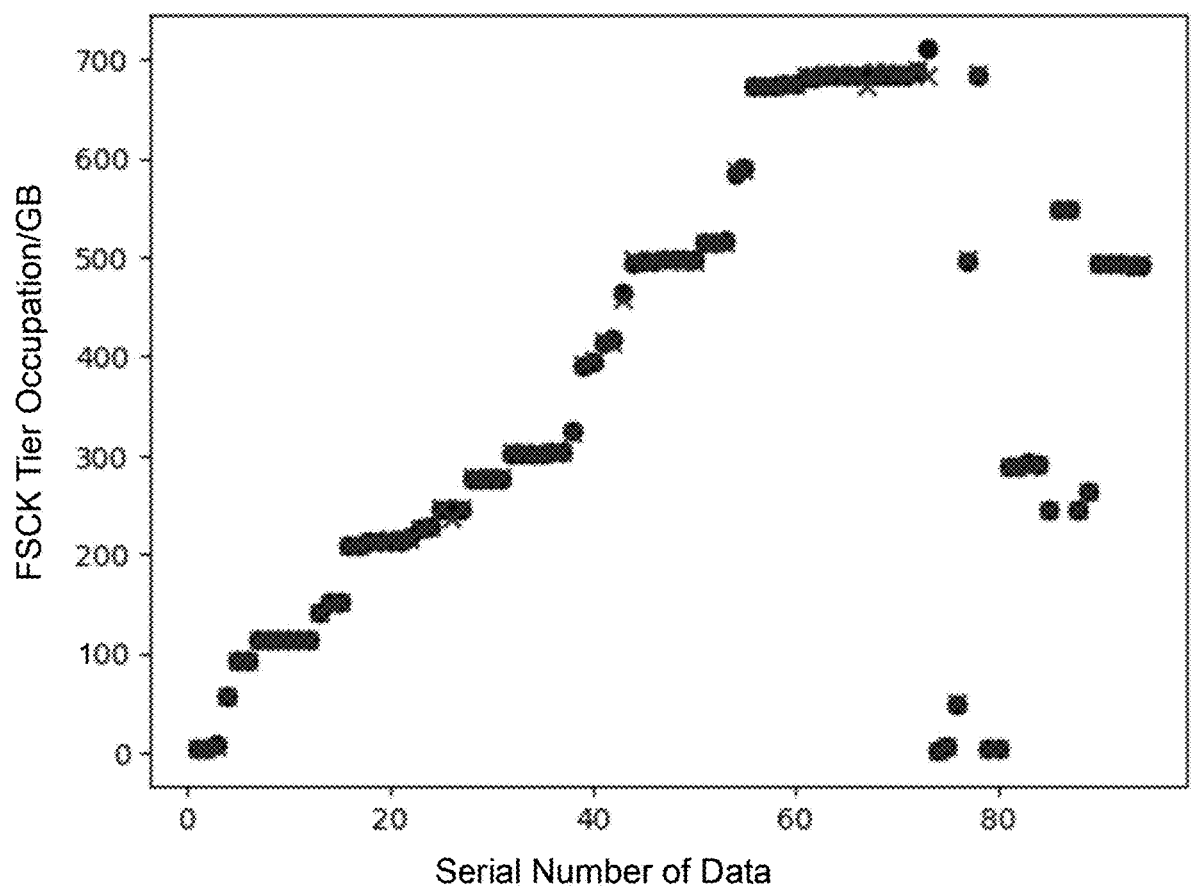
FIG. 7B illustrates a schematic diagram of a comparison of predicted values and true values for a training phase of a neural network model according to some embodiments of the present disclosure.

FIG. 7B illustrates a schematic diagram of a comparison of predicted values and true values for a training phase of a neural network model according to some embodiments of the present disclosure. As shown in FIG. 7B, dots indicate the true values of the space occupation of the FSCK tool, and x indicates the predicted values of the space occupation of the FSCK tool. From FIG. 7B, it can be seen that the prediction of the space consumption of the FSCK tier using the neural network model also has good accuracy.

Figure 8:
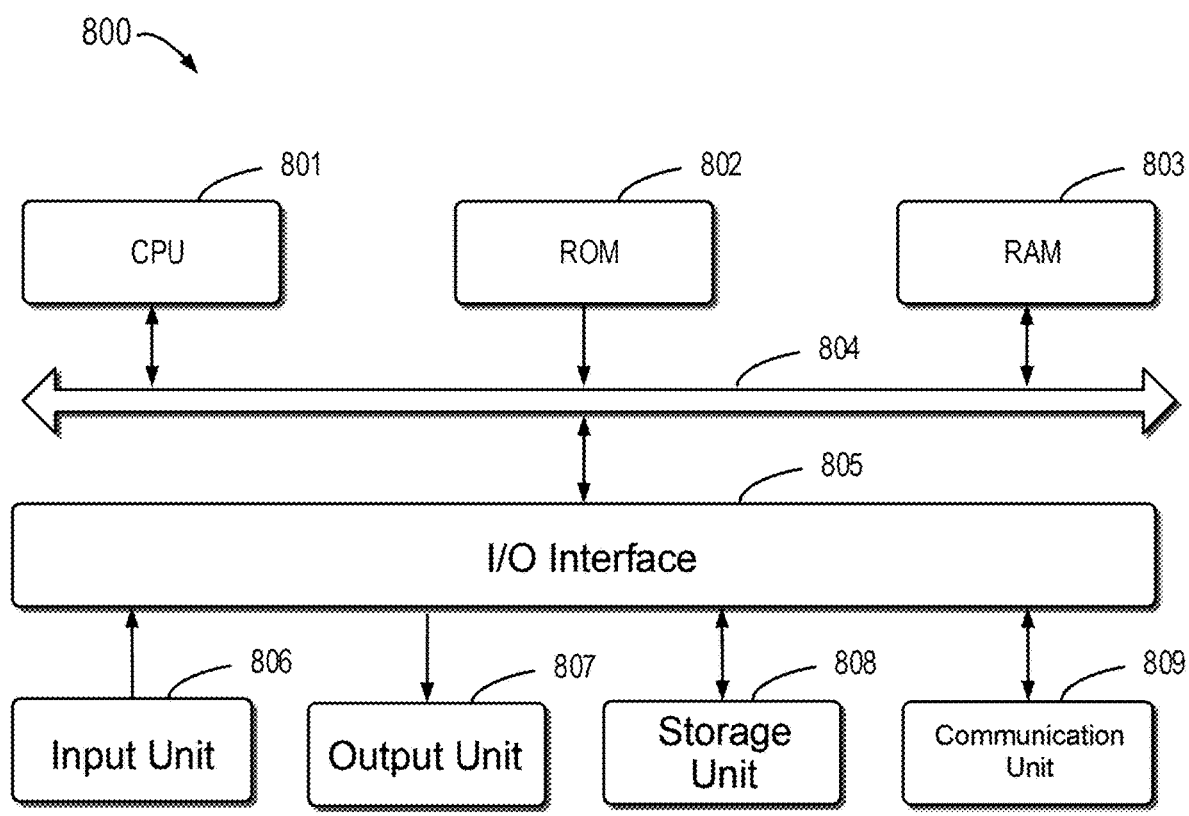
FIG. 8 illustrates a block diagram of a device that can implement a plurality of embodiments of the present disclosure.

FIG. 8 illustrates a schematic block diagram of an example device 800 that can be used to implement embodiments of the present disclosure. As shown in the figure, the device 800 includes a computing unit 801, which may execute various appropriate actions and processing according to computer program instructions stored in a read-only memory (ROM) 802 or computer program instructions loaded from a storage unit 808 onto a random access memory (RAM) 803. Various programs and data required for the operation of the device 800 may also be stored in the RAM 803. The computing unit 801, the ROM 802, and the RAM 803 are connected to each other through a bus 804. An input/output (I/O) interface 805 is also connected to the bus 804.

A plurality of components in the device 800 are connected to the I/O interface 805, including: an input unit 806, such as a keyboard and a mouse; an output unit 807, such as various types of displays and speakers; the storage unit 808, such as a magnetic disk and an optical disc; and a communication unit 809, such as a network card, a modem, and a wireless communication transceiver. The communication unit 809 allows the device 800 to exchange information/data with other devices via a computer network, such as the Internet, and/or various telecommunication networks.

The computing unit 801 may be various general-purpose and/or special-purpose processing components with processing and computing capabilities. Some examples of the computing unit 801 include, but are not limited to, central processing units (CPUs), graphics processing units (GPUs), various specialized artificial intelligence (AI) computing chips, various computing units for running machine learning model algorithms, digital signal processors (DSPs), and any appropriate processors, controllers, microcontrollers, etc.

The computing unit 801 performs various methods and processes described above, such as the method 300. For example, in some embodiments, the method 300 may be implemented as a computer software program that is tangibly included in a machine-readable medium such as the storage unit 808. In some embodiments, part or all of the computer program may be loaded and/or installed onto the device 800 via the ROM 802 and/or the communication unit 809. When the computer program is loaded to the RAM 803 and executed by the computing unit 801, one or more steps of the method 300 described above may be performed. Alternatively, in other embodiments, the computing unit 801 may be configured to implement the method 300 in any other suitable manners (such as by means of firmware).

The functions described hereinabove may be executed at least in part by one or more hardware logic components. For example, without limitation, example types of available hardware logic components include: a Field Programmable Gate Array (FPGA), an Application Specific Integrated Circuit (ASIC), an Application Specific Standard Product (ASSP), a System on Chip (SOC), a Load Programmable Logic Device (CPLD), and the like.

Program codes for implementing the method of the present disclosure may be written by using one programming language or any combination of multiple programming languages. The program code may be provided to a processor or controller of a general purpose computer, a special purpose computer, or another programmable data processing apparatus, such that the program code, when executed by the processor or controller, implements the functions/operations specified in the flow charts and/or block diagrams. The program code may be executed completely on a machine, executed partially on a machine, executed partially on a machine and partially on a remote machine as a stand-alone software package, or executed completely on a remote machine or server.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combinations thereof. Additionally, although operations are depicted in a particular order, this should be understood that such operations are required to be performed in the particular order shown or in a sequential order, or that all illustrated operations should be performed to achieve desirable results. Under certain environments, multitasking and parallel processing may be advantageous. Likewise, although the above discussion contains several specific implementation details, these should not be construed as limitations to the scope of the present disclosure. Certain features that are described in the context of separate embodiments may also be implemented in combination in a single implementation. Conversely, various features that are described in the context of a single implementation may also be implemented in a plurality of implementations separately or in any suitable sub-combination.

Although the present subject matter has been described using a language specific to structural features and/or method logical actions, it should be understood that the subject matter defined in the appended claims is not necessarily limited to the particular features or actions described above. Rather, the specific features and actions described above are merely example forms of implementing the claims.

The invention claimed is:

1. A method for determining space consumption, comprising:
acquiring a first feature set of a storage system, wherein the first feature set comprises at least a size of logical space of the storage system;
determining space consumption for file system checks of the storage system by a machine learning model based on the first feature set; and
adjusting a reserved value of physical storage space of the storage system in response to the determined space consumption meeting a predetermined condition.

2. The method according to claim 1, wherein determining space consumption for file system checks of the storage system comprises:
acquiring a second feature set by performing feature extraction on the first feature set based on a feature extraction strategy, wherein the number of features of the second feature set is smaller than that of the first feature set; and
determining the space consumption for file system checks of the storage system by the machine learning model based on the second feature set.

3. The method according to claim 2, wherein the feature extraction strategy comprises:
merging sizes of logical space of different users in the storage system;
merging sizes of physical space of different users in the storage system; and
merging namespace object features in the storage system, wherein the namespace object features include volume, snapshot, and clone counts.

4. The method according to claim 2, wherein the machine learning model is a pre-trained linear regression model, wherein determining space consumption for file system checks of the storage system comprises:
acquiring a target feature associated with the space consumption for file system checks of the storage system from the second feature set; and
inputting the target feature into the linear regression model to determine the space consumption for file system checks of the storage system.

5. The method according to claim 4, wherein a method for determining the target feature comprises:
acquiring a first training set for determining the target feature, wherein the first training set comprises at least a size of logical space in the storage system and the space consumption for file system checks of the storage system;
determining a degree of correlation between the space consumption for file system checks of the storage system and the remaining features in the first training set; and
determining the target feature based on the degree of correlation.

6. The method according to claim 4, wherein a pre-training operation for the linear regression model comprises:
acquiring a second training set for training the linear programming model, wherein the second training set comprises at least the target feature and the space consumption for file system checks of the storage system;
initializing weights and bias values of the linear regression model;
determining a first loss based on the second training set; and
adjusting the weights and bias values in the linear regression model based on the first loss until a preset condition is met.

7. The method according to claim 6, further comprising:
pre-processing features in the second training set, wherein the pre-processing comprises at least data cleaning and data transformation.

8. The method according to claim 1, wherein the machine learning model is a pre-trained neural network model, the method further comprising:
pre-processing features in the first feature set, wherein the pre-processing comprises at least data cleaning and normalization processing; and
inputting the pre-processed features into the pre-trained neural network model to determine the space consumption for file system checks of the storage system.

9. The method according to claim 2, wherein the machine learning model is a pre-trained neural network model, the method further comprising:
pre-processing features in the second feature set, wherein the pre-processing comprises at least data cleaning and normalization processing; and
inputting the pre-processed features into the pre-trained neural network model to determine the space consumption for file system checks of the storage system.

10. The method according to claim 8, wherein a pre-training operation for the neural network model comprises:
acquiring a third training set for training the neural network model, wherein the third training set comprises at least the space consumption for file system checks of the storage system;
determining a second loss by the neural network model based on the third training set and parameters, wherein the parameters comprise a learning rate and the number of iterations; and
adjusting weights and bias values in the neural network model based on the second loss until a preset condition is met.

11. The method according to claim 10, further comprising:
pre-processing features in the third training set, wherein the pre-processing comprises at least data cleaning and normalization processing.

12. An electronic device, comprising:
at least one processor; and
coupled to the at least one processor and having instructions stored thereon, wherein the instructions, when executed by the at least one processor, cause the electronic device to perform actions comprising:
acquiring a first feature set of a storage system, wherein the first feature set comprises at least a size of logical space of the storage system;
determining space consumption for file system checks of the storage system by a machine learning model based on the first feature set; and adjusting a reserved value of physical storage space of the storage system in response to the determined space consumption meeting a predetermined condition.

13. The device according to claim 12, wherein determining space consumption for file system checks of the storage system comprises:
   acquiring a second feature set by performing feature extraction on the first feature set based on a feature extraction strategy, wherein the number of features of the second feature set is smaller than that of the first feature set; and
   determining the space consumption for file system checks of the storage system by the machine learning model based on the second feature set.

14. The device according to claim 13, wherein the feature extraction strategy comprises:
   merging sizes of logical space of different users in the storage system;
   merging sizes of physical space of different users in the storage system; and
   merging namespace object features in the storage system, wherein the namespace object features include volume, snapshot, and clone counts.

15. The device according to claim 13, wherein the machine learning model is a pre-trained linear regression model, wherein determining space consumption for file system checks of the storage system comprises:
   acquiring a target feature associated with the space consumption for file system checks of the storage system from the second feature set; and
   inputting the target feature into the linear regression model to determine the space consumption for file system checks of the storage system.

16. The device according to claim 15, wherein a method for determining the target feature comprises:
   acquiring a first training set for determining the target feature, wherein the first training set comprises at least a size of logical space in the storage system and the space consumption for file system checks of the storage system;
   determining a degree of correlation between the space consumption for file system checks of the storage system and the remaining features in the first training set; and
   determining the target feature based on the degree of correlation.

17. The device according to claim 15, wherein a pre-training operation for the linear regression model comprises:
   acquiring a second training set for training the linear programming model, wherein the second training set comprises at least the target feature and the space consumption for file system checks of the storage system;
   initializing weights and bias values of the linear regression model;
   determining a first loss based on the second training set; and
   adjusting the weights and bias values in the linear regression model based on the first loss until a preset condition is met.

18. The device according to claim 17, wherein the actions further comprise:
   pre-processing features in the second training set, wherein the pre-processing comprises at least data cleaning and data transformation.

19. The device according to claim 12, wherein the machine learning model is a pre-trained neural network model, the actions further comprising:
   pre-processing features in the first feature set, wherein the pre-processing comprises at least data cleaning and normalization processing; and
   inputting the pre-processed features into the pre-trained neural network model to determine the space consumption for file system checks of the storage system.

20. A computer program product having a non-transitory computer readable medium which stores a set of instructions to determine space consumption; the set of instructions, when carried out by computerized circuitry, causing the computerized circuitry to perform a method of:
   acquiring a first feature set of a storage system, wherein the first feature set comprises at least a size of logical space of the storage system;
   determining space consumption for file system checks of the storage system by a machine learning model based on the first feature set; and
   adjusting a reserved value of physical storage space of the storage system in response to the determined space consumption meeting a predetermined condition.

* * * * *